United States Patent [19]

Martinie

[11] Patent Number: 4,687,351
[45] Date of Patent: Aug. 18, 1987

[54] MEANS FOR SECURING A BEARING TO A SHAFT

[75] Inventor: Howard Martinie, Simpsonville, S.C.

[73] Assignee: Reliance Electric Company, Greenville, S.C.

[21] Appl. No.: 867,776

[22] Filed: May 27, 1986

Related U.S. Application Data

[63] Continuation-in-part of Ser. No. 677,688, Dec. 3, 1984.

[51] Int. Cl.$^4$ .................................... F16C 35/063
[52] U.S. Cl. ............................................. 384/541
[58] Field of Search .............. 384/510, 537, 541, 559, 384/560, 562, 584, 585, 617, 620; 403/362, 366, 375

[56] References Cited

U.S. PATENT DOCUMENTS

| | | | |
|---|---|---|---|
| 2,136,819 | 11/1938 | Large | 384/541 |
| 2,553,337 | 5/1951 | Shafer | 384/541 |
| 3,301,614 | 1/1967 | Haentjens | 384/472 |
| 3,588,208 | 6/1971 | Kane | 384/541 |
| 3,797,901 | 3/1974 | Smith | 384/541 |
| 4,012,086 | 3/1977 | Kruse | 384/541 |

Primary Examiner—Stuart S. Levy
Assistant Examiner—David Werner
Attorney, Agent, or Firm—Dority & Manning

[57] ABSTRACT

An apparatus for securing a bearing to a shaft comprises an inner race having a raceway disposed around the shaft for receiving the bearing elements; at least one annular end portion disposed around the shaft, extending axially from the raceway, and having a circumferentially continuous outer end; a plurality of screws threaded radially through the end portion for contacting the shaft; and a through-cut slot in the end portion spaced inwardly from the outer end and extending in the circumferential direction in the end portion between the screws and the raceway for minimizing deflection in the raceway from distortion in the end portion caused by the screws. At least two set screws are disposed within a 180° arc, and the slot extends partially around the inner race, paralleling the arc formed by the set screws. The end portion is formed of softer material than the material forming the raceway.

19 Claims, 5 Drawing Figures

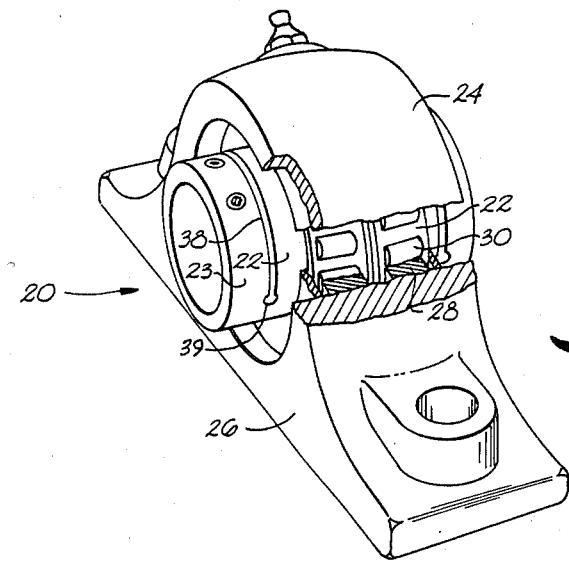
Fig. 1
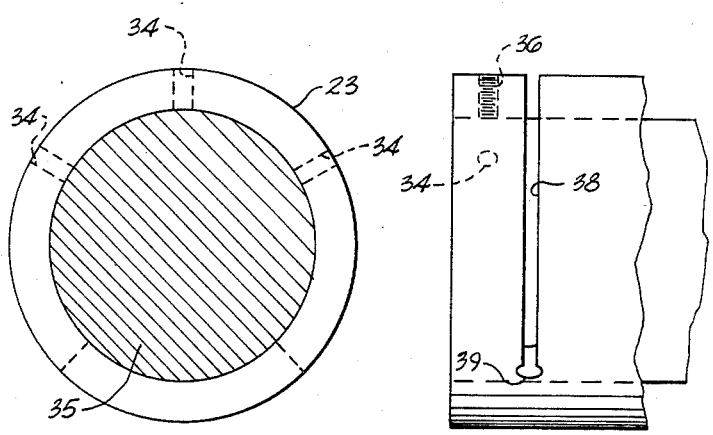
Fig. 2
Fig. 3
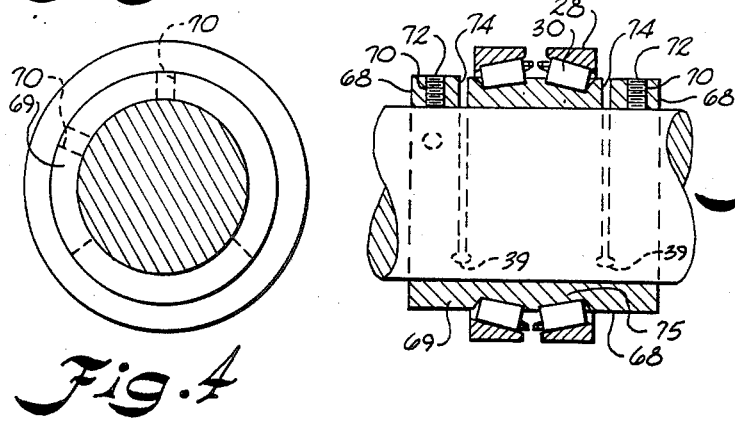
Fig. 4
Fig. 5

MEANS FOR SECURING A BEARING TO A SHAFT

This application is a continuation-in-part application of application Ser. No. 06/677,688, filed Dec. 3, 1984.

BACKGROUND OF THE INVENTION

Where bearing structures, such as pillow blocks, having either spherical or tapered roller bearings or ball bearings, are used for supporting rotatable shaft members, the inner race must be securely locked to the shaft for the bearing structure and associated machinery to operate properly and efficiently. If slippage occurs, the generated forces will be borne by the race instead of the balls or rollers in the bearings. Since lubrication is not supplied to the interface between the shaft and inner race, such slippage results in undesirable metal-to-metal sliding contact, with an associated heat buildup from the friction generated, fretting corrosion, wear, and eventual failure of some or all of the related elements. Many methods have been used to secure the inner race to the shaft. For example, the race may be shrunk or press-fitted to the shaft, which provides a relatively secure grip but requires extremely close tolerances, is generally more expensive than other methods, and makes removal of the fitted elements difficult. Another more common method involves the use of set screws threaded radially through the inner race to contact the shaft in an interface fit, or threaded radially through an over-collar and through an unthreaded hole in the inner race to contact the shaft. An additional method involves the use of a set screw threaded axially through a locking collar, to abut a tapered adapter sleeve and wedge the sleeve against the oppositely tapered outer surface of the inner race, combined with radially disposed set screws in an over-collar, as disclosed in U.S. Pat. No. 3,957,319, owned by the assignee of the present invention.

The use of set screws in any of the previously described embodiments has certain disadvantages. The inner race is normally hardened in the raceway area, with minimum resiliency to withstand the rotative and thrust forces applied by the roller or ball bearing elements. Thus, where set screws are threaded through the inner race, any vibration is transmitted directly to the set screws from the hardened race, leading to loosening of the screws and slippage of the race. The screws may also cause both axial and radial deflection of the inner race, which can extend into the raceway area. Such deflection in the raceway is undesirable, due to load concentration and distortion and adverse vibration in the bearing structure. Additionally, most radially disposed set screws, which are threaded through an over-collar into an unthreaded hole or gap formed in the inner race are easily loosened from vibration or other movements generated through operation of the machinery, and have a tendency to "work" against the inner race, thus causing further loosening and wear on the inner race.

SUMMARY OF THE INVENTION

It is, therefore, one of the principal objects of the present invention to improve the performance of roller or ball bearings by providing means for securing a bearing to a shaft that securely locks the inner race to the shaft for rotation therewith, while minimizing vibratory effects which lead to loosening of the secured race, and subsequent slippage.

Another object of the present invention is to reduce distortion and lobbing in the inner raceway by providing through cut slot means in selected areas of an axial extension of the inner race. The through cut slot means minimizes deflection of the raceway caused by the set screws.

A further object of the present invention is to provide a bearing locking device which can easily be substituted for existing conventional locking devices, has fewer parts and is generally less expensive than conventional means, and which is durable to provide security in shaft-mounted bearings throughout a long service life.

These and additional objects are attained by the present invention, which relates to a means for securing a bearing to a shaft, having an inner race with a raceway disposed around the shaft for receiving the roller or ball elements of the bearing. Extending axially from one or both sides of the raceway is an extension or end portion, which is also disposed around the shaft and has a plurality of threaded holes therein, preferably disposed within an arc of 180°. Securing means are threaded radially through the holes to contact the shaft and to deflect the extension into contact therewith. Preferably, the securing means comprises a plurality of set screws. Means are provided to prevent or minimize deflection from extending into the raceway itself. The means for minimizing the deflection of the raceway caused by the securing means is provided in the wall of the extension between the raceway and the securing means. Preferably, the means for minimizing the deflection of the raceway caused by the securing means comprises a through-cut slot defined in the end portion between the raceway and the securing means and extending in the circumferential direction.

Various other objects and advantages of the present invention will become apparent from the following description, with reference to the accompanying drawings.

BRIEF DESCRIPTION OF THE DRAWINGS

FIG. 1 is a perspective view of the means for securing a bearing to a shaft embodying the present invention, a portion of the bearing housing having been broken away;

FIG. 2 is an end elevational view of the present invention secured to the shaft, the shaft being shown in cross-section, and the broken lines in the lower portion of the inner race illustrating the ends of a through-cut slot;

FIG. 3 is a fragmentary, side elevational view of the device shown in FIG. 2, further illustrating the through-cut slot;

FIG. 4 is an end elevational view of another embodiment of the present invention secured to the shaft, the shaft being shown in cross-section, and the broken lines in the lower portion of the inner race illustrating a through-cut slot; and FIG. 5 is in part a cross-sectional view of an embodiment such as shown in FIG. 4.

DETAILED DESCRIPTION OF THE PREFERRED EMBODIMENT

Referring more specifically to the drawings, and to FIG. 1 in particular, numeral 20 designates generally the means for securing a bearing to a shaft embodying the present invention. The invention includes an inner race 22 and an axial extension or end portion 23 which projects beyond a housing 24 of a pillow block 26 on one end, or on both ends, as shown here. Inner race 22 has a raceway portion 25 for receiving a bearing of the ball-type, or a roller-type as shown here. In bearing structures such as pillow block 26, inner race 22 must be securely locked to a shaft 35 (FIG. 2), while an outer race 28 is locked to housing 24. Inner race 22 is then normally slipped over the shaft, where it is locked to the shaft. The present invention may be practiced with ball-type (not shown) or roller-type bearing elements 30, and in a variety of bearing structures, pillow block 26, shown here, serving as a general example. The extension is provided with a plurality of threaded holes 34, such as the three shown in the embodiment of FIGS. 2 and 3, for receiving securing means. Preferably, at least two set screws 36 comprise the securing means. The set screws are disposed radially and within an arc of less than one-hundred eighty degrees, and the present invention may be practiced with a minimum of two set screws, as in the embodiment of FIGS. 4 and 5, up to as many as are required, based on the size of the assembly.

Either the entire extension of inner race 22 or portions of the inner race in the set screw mounting area are composed of a softer and more resilient metal than the normally hardened metal forming a raceway 32 which receives roller elements 30. In the embodiment shown in FIG. 2 with three set screws, each screw applies tension to the end portion of the inner race, which is transmitted through the relatively softer metal to the additional screws, tending to prevent loosening of the screws from vibration or other effects. In addition, the holding force is greatly increased. Thus, locking contact between shaft 35 and the extended end portion is established between the screws. Normally, the use of set screws threaded radially through the inner race extension to contact the shaft produces a desirable deflection of the extension of the race, in that the deflection and subsequent contact lock the elements together. The deflection, however, if extensive, may extend into the raceway area, leading to undesirable load concentration, bearing structure distortion, and adverse vibration.

As embodied herein and shown for example in FIGS. 1–3, the means for preventing or minimizing the deflection from extending into the raceway, comprises a through-cut slot 38 provided in the wall of the extension of the inner race, between the set screw mounting area and the raceway, for absorbing the force applied to the extension. Slot 38 extends completely through the inner race and partially around the circumference of extension 23 and preferably extends approximately 270° around the circumference of the extension. As shown in FIG. 1, slot 38 is completely peripherally bounded by extension 23. The slot means prevents stress concentration, and absorbs the force exerted on the extension of the inner race and prevents or minimizes the intrusion of the distortion into the raceway area, thereby assuring that the raceway retains its original configuration.

Modified forms of the present invention are shown in FIGS. 4 and 5. In FIGS. 4 and 5, the extension 68 of inner race 69 is provided with two threaded holes 70, disposed approximately sixty-five degrees apart, for receiving set screws 72. A through-cut slot 74 is provided through the extension, between the set screw mounting area and a raceway 75.

The entire extension of the inner race, or portions thereof in the set screw mounting area is softened as previously discussed, to permit it to be distorted to facilitate the locking action. The extension is deflected more when two set screws are used than when three or more are used. However, the through-cut slot prevents or minimizes the deflection from intruding into the raceways. As in the previous embodiments, the through-cut slot extends around the extension parallel to the arc formed by the disposition of the set screws and extends beyond the circumferential location of outermost set screws.

In all the embodiments disclosed herein, a through-cut slot is formed by drilling two holes 39 (FIGS. 1, 3 and 5) radially through the extension and spaced about 270° around the circumference thereof. Then a slot is cut through the extension in the 270° separation between the two radially drilled end-holes. The width of the slot preferably is less than the diameter of each of the end-holes. Moreover, a slot preferably is included on each side of the extension of the inner race. However, a single through-cut slot on one side may allow sufficient force to be placed on the set screws to secure the inner race to the shaft in light-duty installations without appreciable deflection encroaching on the raceway. Where greater holding action is required, and greater force is applied to the set screws, through-cut slots may be included on both extensions of the inner race to ensure that any deflection of the extensions will not cause lobbing or will minimize its effect on the configuration of the raceway.

Similarly, two or more set screws may be used, depending on the particular installation. The set screws are disposed within an arc of approximately 180°, and the preferred use of three screws will ensure tension on all of the screws, improve the spring-locking action, and increase resistance to vibration. The slot means preferably extends through a wider arc than that of the set screws to absorb the force applied to the inner race extension by the set screws. Preferably, the slot means extends over about a 270° arc around the circumference of the extension.

In the use and operation of the present means for securing a bearing to a shaft, the inner race is slipped over the end of the shaft and, as tolerances are normally quite close, tapped into position on the shaft. The axial extension or extensions of the race include at least two, and preferably three, threaded radial holes for receiving suitable fastening means, such as set screws, disposed within an arc of 180°. The entire extension, or portions thereof in the area of the threaded holes, are composed of a relatively resilient metal to more easily deflect toward the shaft and to transmit the tension applied by a single set screw through the extension to the other set screws. This occurs with all of the set screws. Moreover, as the screws are threaded radially through the holes to contact the shaft, the extension is forced into locking contact with the shaft on the side opposite the set screws. The locking contact thereby established, in combination with the set screws, secures the inner race and shaft together, preventing relative rotation therebetween. Since the deflection caused in the extension of the race must not intrude into the raceway itself, through-cut slot means is provided between the set screws and the raceway itself. The stress relief slot preferably extends through an arc wider than that formed by the set screws. The through-cut slots absorb the applied force, thereby preventing or minimizing the distortion from encroaching into the raceway.

While one embodiment of a means for securing a bearing to a shaft and several modifications thereof have been shown and described in detail herein, various changes and other modifications may be made without departing from the scope of the invention. It will be apparent to those skilled in the art that various modifications and variations can be made in the means for securing a bearing to a shaft without departing from the scope or spirit of the invention. Thus, it is intended that the present invention cover the modifications and variations which come within the scope of the appended claims and their equivalents.

What is claimed is:

1. A means for securing to a shaft a bearing having bearing elements, comprising:
   a. an inner race having a raceway disposed around the shaft for receiving the bearing elements;
   b. at least one annular end portion disposed around the shaft, extending axially from said raceway, and having a circumferentially continuous outer end;
   c. a plurality of screws threaded radially through said end portion for contacting the shaft; and
   d. a through-cut slot defined in said end portion spaced inwardly from said outer end, said slot being completely bounded peripherally by said end portion and extending in the circumferential direction in said end portion between said screws and said raceway; said through-cut slot reducing stress concentration between said raceway and said screw and minimizing deflection in said raceway originating from distortion in said end portion caused by said screws contacting the shaft.

2. A means for securing a bearing to a shaft as defined in claim 1 in which said end portion is formed of softer material than the material forming said raceway.

3. A means for securing a bearing to a shaft as defined in claim 1 in which said screws include at least two set screws disposed within a 180° arc.

4. A means for securing a bearing to a shaft as defined in claim 3 in which said slot extends partially around said inner race, paralleling the arc formed by said set screws.

5. A means for securing a bearing to a shaft as defined in claim 3 in which said end portion is formed of softer material than the material forming said raceway.

6. A means for securing a bearing to a shaft as defined in claim 4 in which said end portion is formed of softer material than the material forming said raceway.

7. A means for securing a bearing to a shaft as defined in claim 1 in which a radially bored portion defines each end of said slot.

8. A means for securing a bearing to a shaft as defined in claim 1 in which said screws include three set screws disposed within a 180° arc.

9. A means for securing a bearing to a shaft as defined in claim 8 in which said slot extends 270° around said inner race, paralleling the arc formed by said set screws.

10. A means for securing a bearing to a shaft as defined in claim 8 in which said end portion is formed of softer material than the material forming said raceway.

11. A means for securing a bearing to a shaft as defined in claim 9 in which said end portion is formed of softer material than the material forming said raceway.

12. A means for securing a bearing to a shaft, comprising:
   a. an inner race having a raceway and an axial bore for receiving a shaft;
   b. annular end portions on said inner race extending axially from both sides of said raceway, and having circumferentially continuous outer ends;
   c. a plurality of securing means threaded radially through said end portions within an arc of 180°; and
   d. through-cut slot means formed in said end portions between said securing means and said raceway in spaced relation to said outer end, said slot means being completely bounded peripherally by said end portion and extending in a circumferential direction through an arc wider than the arc formed by said securing means, said slot means reducing stress concentration between said raceway and said security means and minimizing deflection in said raceway originating from distortion in said end portion caused by said securing means.

13. A means for securing a bearing to a shaft as defined in claim 12 in which said securing means include three set screws threaded radially through each of said end portions for contacting the shaft.

14. A means for securing a bearing to a shaft as defined in claim 12 in which said end portions are formed of softer material than the material forming said raceway.

15. A means for securing a bearing to a shaft as defined in claim 13 in which said end portions are formed of softer material than the material forming said raceway.

16. A means for securing a bearing to a shaft as defined in claim 12 in which said securing means include at least two set screws threaded radially through each of said end portions for contacting the shaft.

17. A means for securing a bearing to a shaft as defined in claim 16 in which said end portions are formed of softer material than the material forming said raceway.

18. A means for securing a bearing to a shaft as defined in claim 12 in which a radially bored end-hole defines each end of said slot means.

19. A means for securing a bearing to a shaft as defined in claim 18 in which said slot means comprises a through-cut having a width less than the diameter of one of said end-holes.

* * * * *